United States Patent

[11] 3,628,404

| | | | | |
|---|---|---|---|---|
| [72] | Inventor | Raymond A. Riley<br>Bulkington, Nuneaton, England | | |
| [21] | Appl. No. | 824,444 | | |
| [22] | Filed | May 14, 1969 | | |
| [45] | Patented | Dec. 21, 1971 | | |
| [73] | Assignee | The Dunlop Company Limited<br>London, England | | |
| [32] | Priorities | May 17, 1968 | | |
| [33] | | Great Britain | | |
| [31] | | 23,520/68;<br>Nov. 15, 1968, Great Britain, No. 54,263/68 | | |

[54] MACHINE TOOLS
10 Claims, 11 Drawing Figs.

[52] U.S. Cl.................................................. 82/24, 82/36
[51] Int. Cl.......................................................... B23b 21/00
[50] Field of Search............................................ 82/24, 34.4, 36.1

[56] References Cited
UNITED STATES PATENTS

| | | | |
|---|---|---|---|
| 3,191,470 | 6/1965 | Pabst et al. ..................... | 82/36 |
| 3,252,202 | 5/1966 | Bullard et al. ................. | 82/36 X |
| 3,354,761 | 11/1967 | Sadler ........................... | 82/36 A |
| 3,402,625 | 9/1968 | Sweeny ......................... | 82/36 |
| 3,433,104 | 3/1969 | Milewski et al................ | 82/36 |
| 3,490,318 | 1/1970 | Jones............................. | 82/36 |

FOREIGN PATENTS

| | | | |
|---|---|---|---|
| 119,530 | 4/1927 | Switzerland.................. | 82/36 |

*Primary Examiner*—Leonidas Vlachos
*Attorneys*—Joseph M. Fitzpatrick, John Thomas Cella, Charles B. Cannon, Lawrence F. Scinto, Carrol G. Harper, Charles W. Bradley, Edwin T. Grimes, William J. Brunet and Robert L. Baechtold ABSTRACT: In a machine tool arranged to accept preset tools, a tool carrier on which the preset tools are detachably mounted. Locating surfaces formed either in an aperture or on a support projection of the carrier are arranged to engage corresponding seating surfaces on a tool holder so that with the tool carrier in the operative position the locating surfaces extend parallel to the spindle axis of the machine tool.

MACHINE TOOLS

This invention relates to machine tools of the kind in which a tool and a workpiece are mounted for relative rotational movement with respect to one another about a spindle axis, such as turret lathes. The invention relates particularly to methods and apparatus for mounting cutting tools on a machine tool in such a manner as to enable a cutting tool to be preset on a jig or fixture separately from the machine tool and subsequently clamped to the machine tool without the need for a setting up operation on the machine tool itself.

In systems of preset tooling of the kind described above, it has been proposed to mount the tool and its holder on a carrier member which is removable from the machine tool, and while this may readily be carried out with small and medium-size machine tools, in large machine tools problems would arise in removing, for example, the very heavy carrier bracket by which the tool holder is usually secured to a lathe turret.

One object of the present invention is to provide means by which a tool holder may be detachably mounted in a preset position on a carrier such as a large "knee turner" bracket. The invention is however applicable to other forms of tool carrier.

According to one aspect of the invention there is provided a tool carrier arranged to be mounted on a machine tool, the carrier having two locating surfaces for engagement with corresponding seating surfaces formed on a tool holder, the locating surfaces being angularly inclined relative to one another and arranged so that in the operative position of the tool carrier the locating surfaces extend parallel to the spindle axis of the machine tool.

According to another aspect of the present invention there is provided a tool holder arranged to be mounted on a machine tool and having two seating surfaces for engagement with corresponding locating surfaces formed on a tool carrier, the locating surfaces being angularly inclined relative to one another and arranged so that in the operative position of the tool carrier the locating surfaces extend parallel to the spindle axis of the machine tool.

According to another aspect of the invention a method of locating a tool in a desired operative position on a machine tool comprises placing the tool in a tool holder having a pair of spaced seating surfaces angularly inclined relative to one another and positioning the tool in relation to said seating surfaces, and subsequently clamping the tool holder in a tool carrier mounted on the machine tool, the seating surfaces formed on the tool holder engaging locating surfaces associated with the tool carrier, wherein the locating surfaces are arranged to lie parallel with the spindle axis of the machine tool in the operative position of the carrier.

According to a further aspect of the invention a machine tool comprises a tool support means including a tool carrier and tool holder as defined above, the tool carrier being adjustably mounted on the machine tool.

Several embodiments of the invention will now be described with reference to the accompanying drawings in which.

A conventional turret lathe comprising a hexagonal turret A, associated tool carriers B, C, lathe bed D and cross-slide E is prepared to receive preset tools in tool holders in the following manner.

Figure 1:
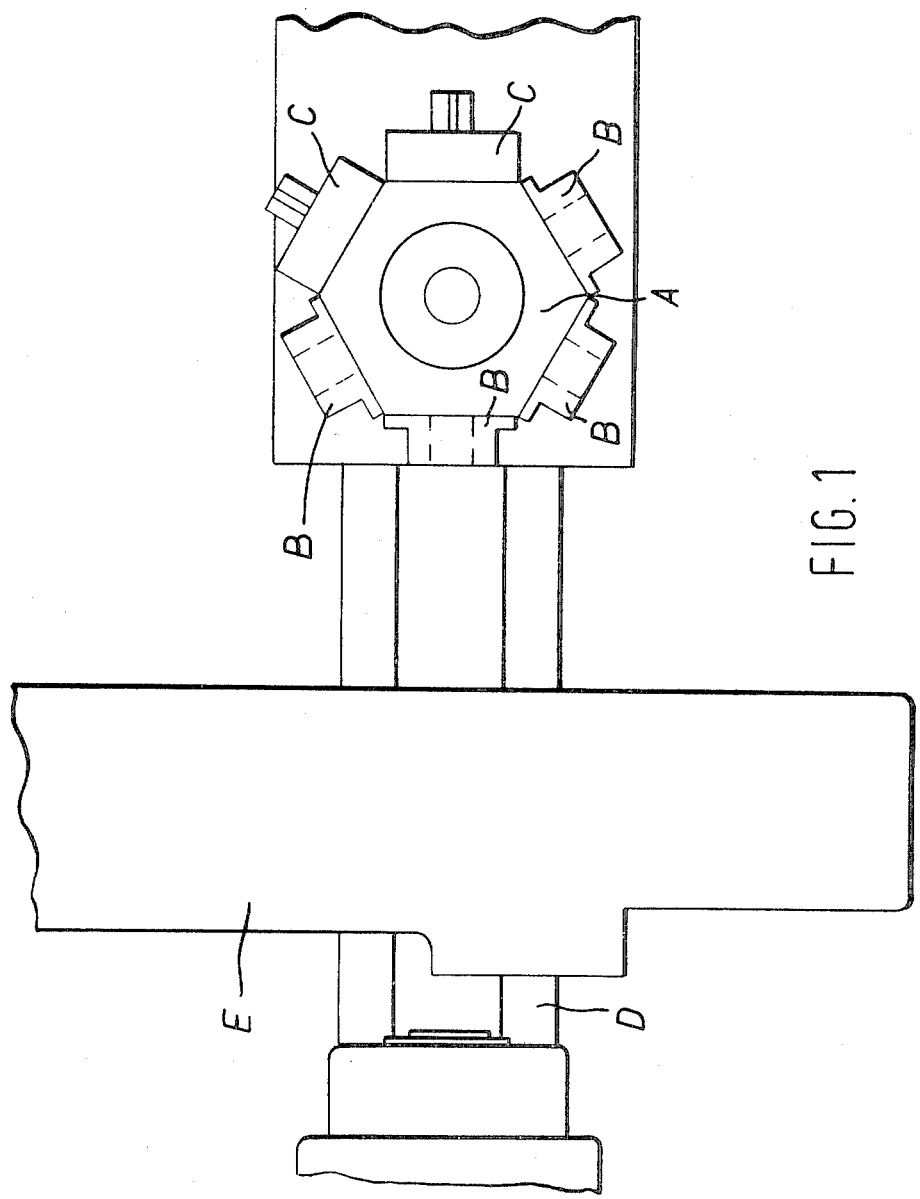
FIG. 1 is a diagrammatic arrangement showing the orientation in plan of tool carriers according to the present invention when employed on a turret lathe.
Figure 2:
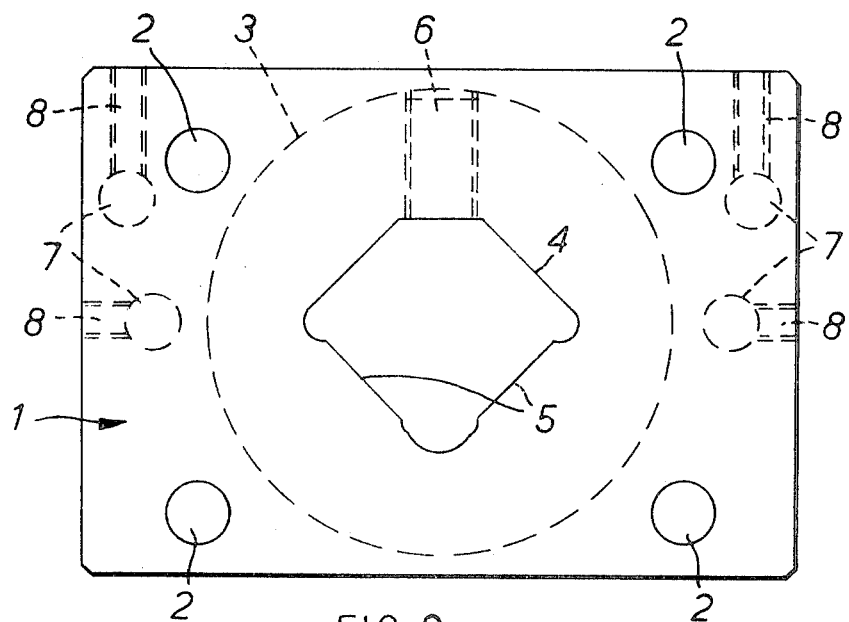
FIG. 2 is a rear elevation of a tool carrier, without a tool holder in position, incorporating a substantially square cross section locating aperture.
Figure 3:
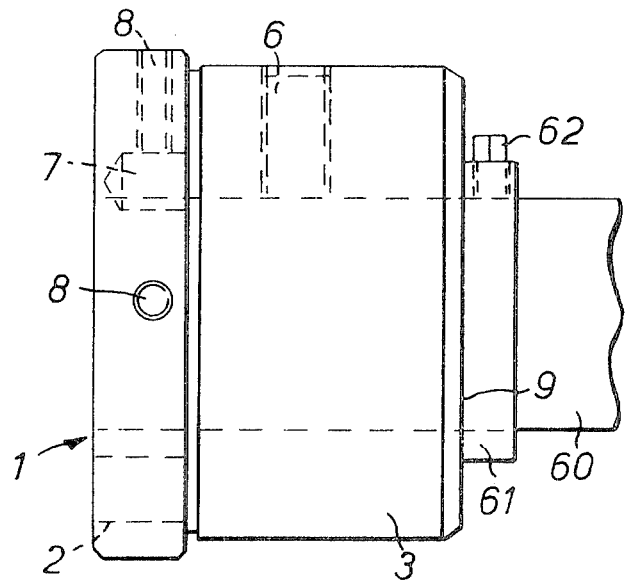
FIG. 3 is a side elevation of the tool carrier shown in FIG. 2.
Figure 4:
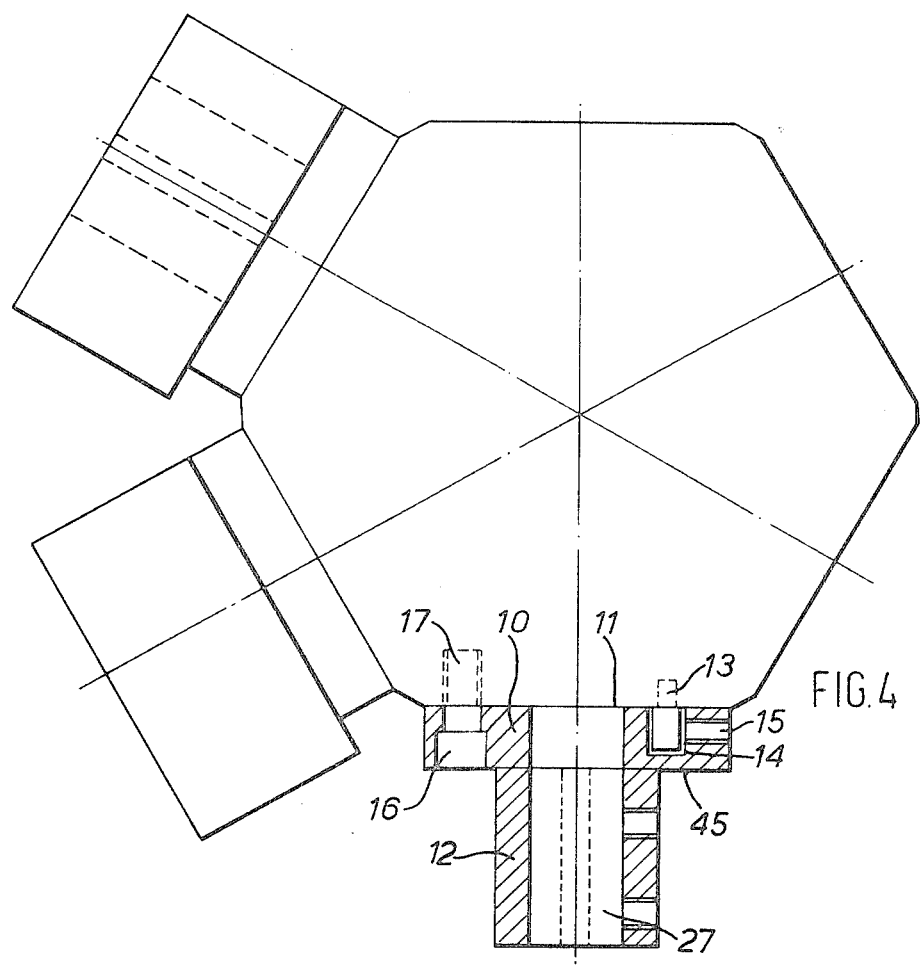
FIG. 4 is a sectional plan view of a tool carrier incorporating a support projection of substantially square cross section, the section being taken on three different horizontal planes I—I, II—II and III—III as indicated in FIG. 5.
Figure 5:
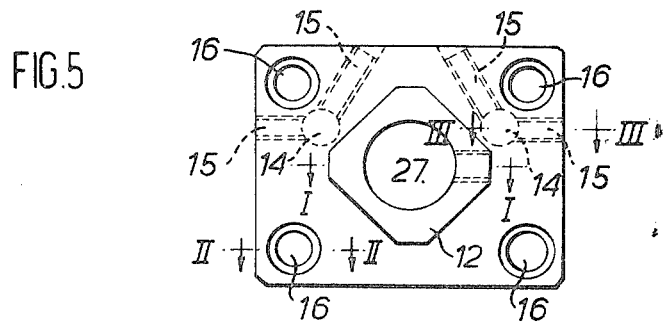
FIG. 5 is a front elevation of the tool carrier shown in FIG. 4.

As illustrated in FIGS. 2 and 3 a tool carrier in the form of a changer plate to which tool holders may be detachably secured is arranged to be bolted to an associated turret face, as shown at B in FIG. 1, by four bolts passing through holes 2 positioned at the corners of the plate and comprises a central boss 3 arranged to extend at right angles to the turret spindle and having an aperture 4 formed therein, the axis of which is arranged to intersect the turret spindle axis at right angles. The aperture is approximately rectangular in form and is arranged with one diagonal vertical. The two lower sides of the aperture are machined to form accurate locating surfaces 5 for a tool holder 60 (part of which is shown only in FIG. 3) of corresponding shape to be inserted in the aperture, the angle between the two locating surfaces being formed with a radius so that when located in the aperture the tool holder rests with the two locating surfaces engaging corresponding seating surfaces on the tool holder and thus forming the only regions of contact with the tool holder. The upper portion of the boss is bored and threaded to receive a vertically disposed clamping screw 6 which is engageable with the upper surface of the tool holder, the upper surface of the tool holder being arranged to enter the aperture with a substantial clearance from the upper sides thereof to enable the tool holder to be clamped in position in the aperture solely by the action of the clamping screw exerting downward pressure on the tool holder to force it into firm engagement with the locating surfaces formed in the aperture.

The changer plate is provided with four sockets 7, two on each side of the boss, which are arranged to fit over corresponding pegs (not shown) secured to the turret face, and screw-threaded holes 8 are arranged, leading into the respective sockets, to house adjustment screws (not shown) which are engageable with the pegs when the plate is mounted on the turret. One socket on each side is provided with a vertical adjustment screw leading from the upper edge of the plate into the socket and the other socket on each side is provided with a horizontal adjustment screw leading from the associated side edge of the plate into the socket. By adjustment of the four screws the adapter plate can be adjusted in position and secured by means of the four bolts at its corners with the axis of the aperture aligned accurately in a known relationship to the spindle axis.

Although only one method of adjusting the position of the changer plate relative to the adjacent turret face has been described above, it will be realized that any of the adjustment means described in our copending applications, Ser. Nos. 44,260/68 and 1,786/69 may also be employed.

In operation, to set up a machine tool having a tool carrier as described above a similar tool carrier is used as part of a setting up fixture which may be at some distance from the machine tool and which is provided with suitably calibrated gauges to enable the tool to be preset in its holder so that when the tool holder is mounted in the carrier on the machine the cutting edge of the tool will be in the correct angular relationship with the locating surfaces in the carrier. The axial position of the tool holder relative to the axis of the aperture in the tool carrier can be preset by means of a collar 61 mounted slidably on the tool holder and which can be secured in position thereon in the presetting operation by means of a screw 62, the collar being engageable with the outer abutment face 9 of the boss on the carrier to limit the extent to which the tool holder can be inserted into the aperture.

The changer plate is set up on the machine to an accurately aligned position relative to the spindle axis, and thus the preset relationship of the cutting edge of the tool to the seating surfaces of the tool holder enables the tool holder to be clamped in the carrier without the need for further adjustment of the tool on the machine. The machine can thus be brought into immediate operation without the need for time-consuming setting up operations whenever the tool is changed.

In another embodiment of the invention, illustrated in FIGS 4-8, a tool carrier for a small capstan lathe comprises a changer plate 10 arranged to be secured to one turret face 11 of the lathe and having a support projection 12 of generally square cross-sectional shape arranged to extend radially outwardly, with respect to the turret axis, from the changer plate, the projection being orientated so that one diagonal of its cross-sectional profile lies vertically.

The changer plate is secured to the turret face in the following manner. Two dowel pegs 13 are force fitted into the turret face in spaced apart positions and engage corresponding sockets 14 in the form of clearance holes formed in the changer plate. Each socket in the changer plate is provided with a pair of screw-threaded holes 15 leading into the socket from two adjacent side edges of the changer plate and extending transversely to the axis of the socket. The threaded holes contain grub screws (not shown) which bear against the dowel pegs and provide means for adjusting the position of the changer plate in a plane parallel to that of the turret face. After adjustment of the changer plate the changer plate is secured semipermanently to the turret face by means of four screws, (not shown,) one at each corner, passing through clearance holes 16 in the changer plate and engaging screw-threaded holes 17 in the turret.

A cutting tool 18 is arranged to be mounted in predetermined relationship with the changer plate 10 by means of two components, a tool holder 19 which comprises a rectangular shank portion and a tool holder adapter member in the form of a rigid metal adapter plate 20 having a first generally aperture 21 in which the rectangular shank of the tool holder is detachably received and second generally rectangular aperture 22 for location on the support projection 12 of the changer plate.

The bar of the tool holder is arranged to be a clearance fit in the first aperture, but is located in firm engagement with two adjacent side surfaces thereof by means of a clamping screw 23 extending diagonally with respect to the first aperture in a screw-threaded hole formed in the adapter plate so as to apply pressure to one corner of the tool holder shank. The adapter plate is detachably located on the support projection with the two lower surfaces 24 of its second aperture arranged to form seating surfaces which engage corresponding locating surfaces formed on the support projection, the seating surfaces being held in firm engagement with the locating surfaces 25 by means of a pinch bolt 26 located in a transverse bore of the adapter plate and arranged to apply pressure to the upper edge of the support projection.

The operation of the apparatus described above to enable a tool to be preset in a position remote from the machine tool so as to enable it to be mounted on the machine tool without the need for further setting up is as follows:

The tool holder and adapter plate are removed, together, from the lathe turret by releasing the pinch bolt and sliding the adapter plate off the support projection. The adapter plate is then secured by means of the pinch bolt to a support projection mounted on a separate setting jig (not shown) and of similar construction to that on the changer plate. When in position on the setting jig the tool is adjusted in the tool holder so that its cutting edge is in a required position relative to the seating surfaces formed in the second aperture. The set position of the tool is arranged to correspond to a position which the tool will take up in a plane parallel to the plane of the turret face when it is fitted to the machine tool. The position of the tool measured in a radial direction, relative to the turret axis, from the turret face is also set by measurement in the setting jig, in which the adapter plate is arranged to lie with its rear face in contact with a datum abutment face formed on the tool carrier of the setting jig. This datum face corresponds to the abutment face 45 of the changer plate on the machine tool against which the adapter plate is held when the adapter plate is clamped in position on the support projection.

By the method described above, the tool can be preset by measurement on the setting jig and can then be placed on the machine tool without the need for any further setting up procedure.

In an alternative arrangement, the adapter plate may remain on the turret as a semipermanent fixture, and the tool holder shank may be removed from the first aperture of the adapter plate for setting up purposes. In this arrangement, the adapter plate becomes effectively part of the tool carrier. Means would be provided in this case, for example in the form of a collar (not shown) on the tool holder shank, to provide a stop engageable with the adapter plate to enable the distance of the tool from the turret axis to be determined.

In addition to its function in providing a support for a detachable adapter plate, the support projection of the carrier plate may have a cylindrical or tapered socket 27 in which a boring tool 28 or other tool may be located.

In the embodiment described above, the tool carrier consists of an adapter plate which may be secured to a lathe turret to hold, for example, a boring tool. The invention is however particularly advantageous when applied to a tool carrier in the form of a knee turner bracket for a large lathe. In this case the apertures in the bracket, which are usually cylindrical in conventional brackets, are each provided with a pair of spaced inclined locating surfaces as in the adapter plate described above, and a suitable clamping device is provided. The bracket is accurately mounted in position on the turret, and this arrangement enables the tool holders to be removed and preset without taking the machine out of service and without the need to remove the very large and heavy tool carrier bracket which may be provided on large machine tools of this type.

Figure 6:
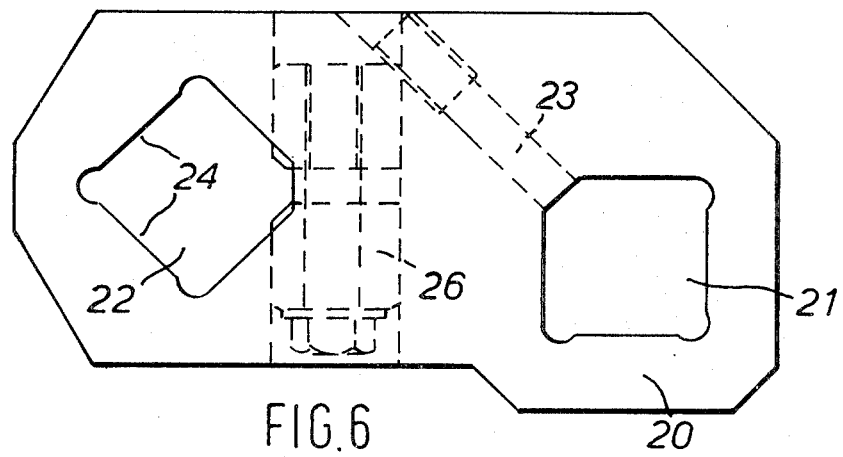
FIG. 6 is a front elevation of an adapter plate.
Figure 7:
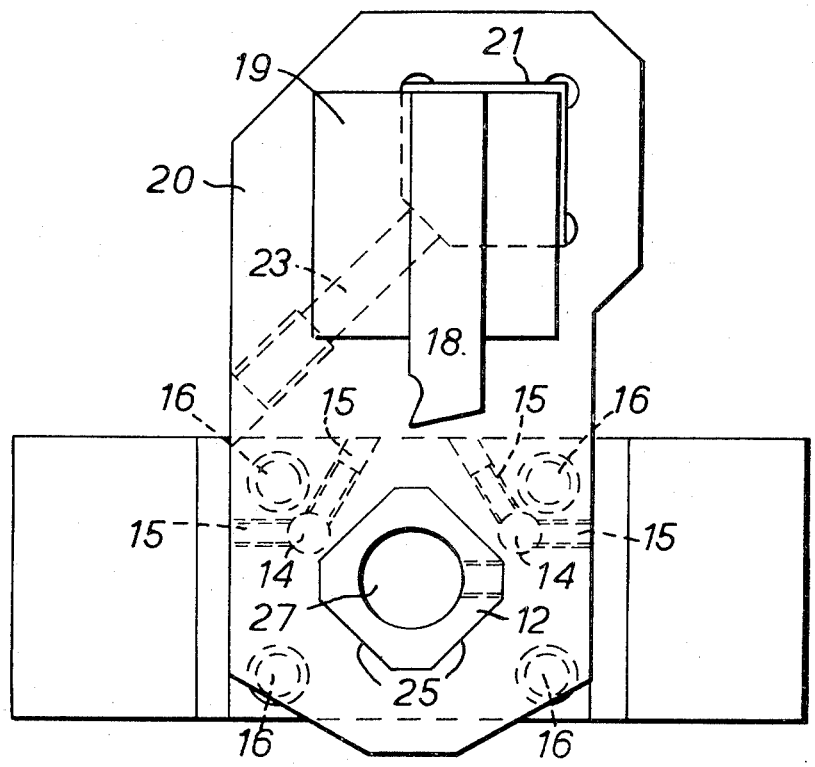
FIG. 7 is a front elevation of a tool carrier with an adapter plate and tool holder attached.
Figure 8:
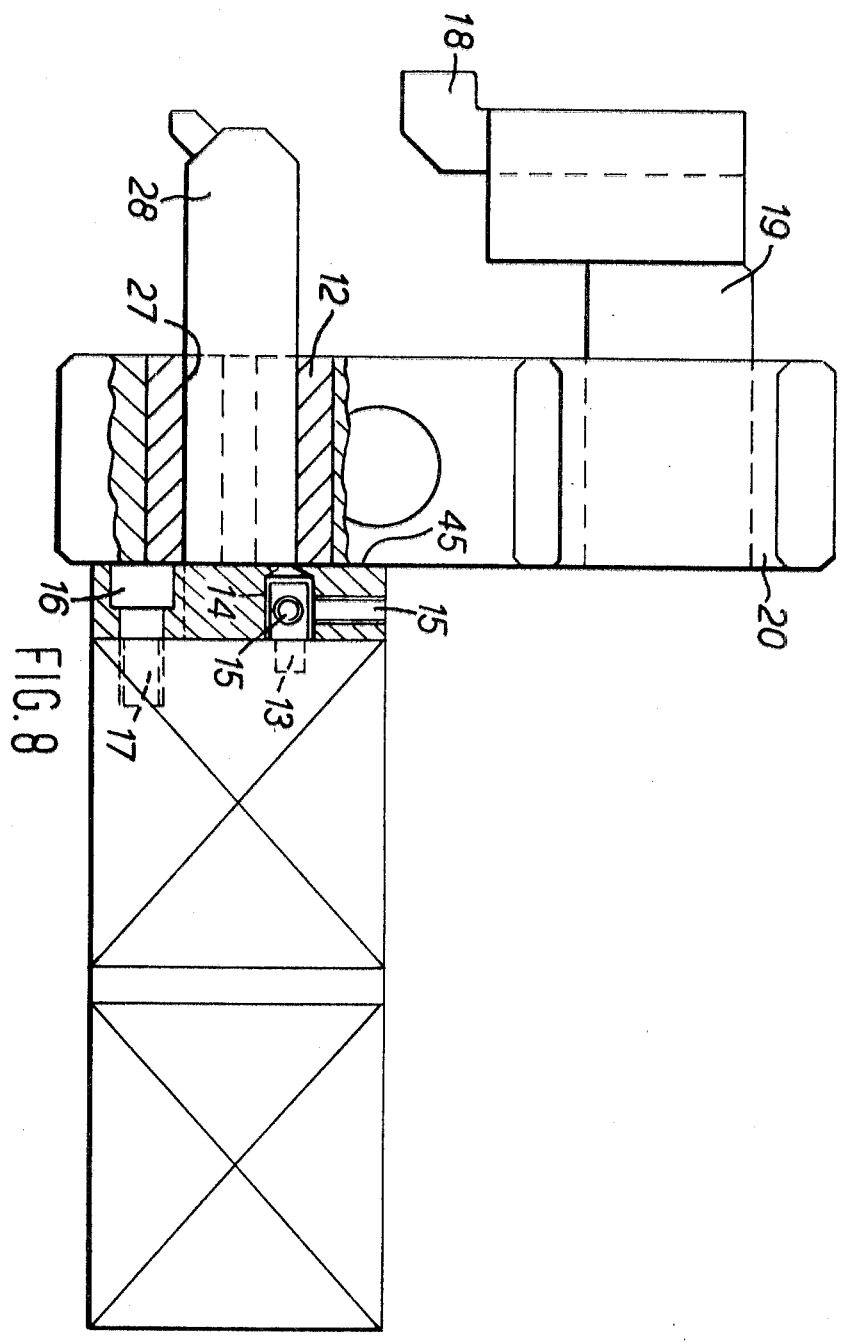
FIG. 8 is a part sectional side elevation of the tool carrier shown in FIG. 7 with an additional tool positioned in a socket in the tool carrier.
Figure 9:
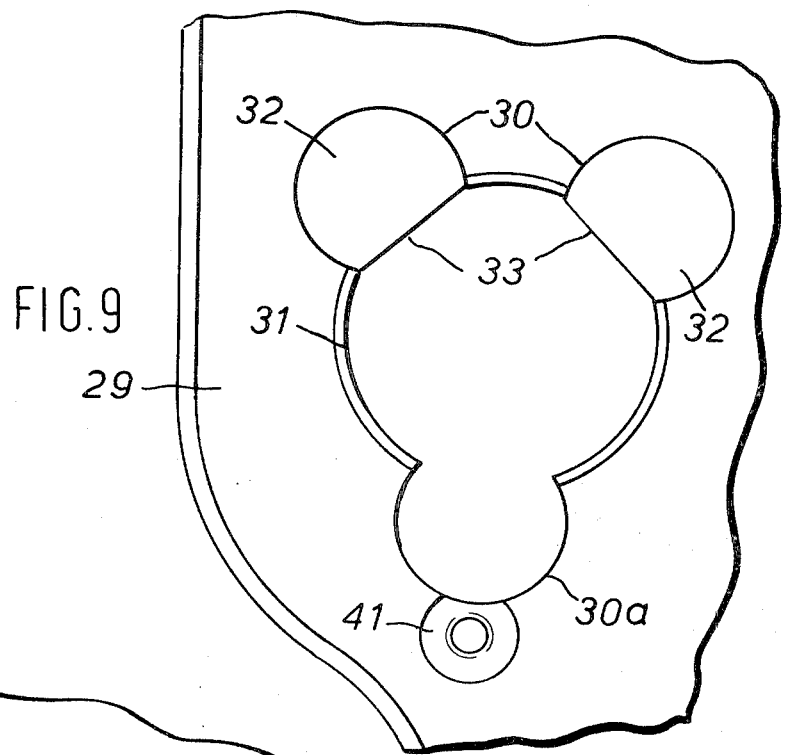
FIG. 9 is a front elevation of part of a knee turner bracket showing an aperture in which each locating surface is provided by a press-fitted insert.

FIG. 9 shows one practical way of providing the angularly inclined locating surfaces of each aperture in a knee turner bracket 29 which eliminates the machining operations necessary to produce square apertures of the kind illustrated in FIGS. 2 and 6.

Figure 10:
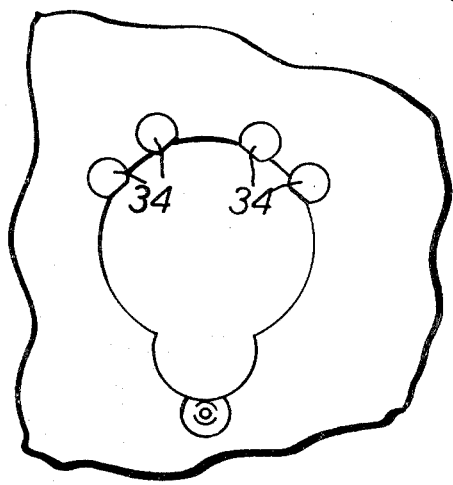
FIG. 10 is a plan view of part of a tool carrier showing an aperture in which each locating surface is provided by two press-fitted inserts.

The aperture, shown in FIG. 9, designed to receive a tool holder, is produced by the drilling of four holes, three smaller diameter holes 30 and one larger diameter hole 31. Two inserts 32 of part-cylindrical cross section are press fitted into two of the three segmentally shaped recesses formed by the intersection of holes 30 and 31. These inserts have machined edges 33, which may also be heat treated and which provide the two locating surfaces of each aperture. Alternatively, two smaller diameter inserts 34 can be used to provide each locating surface as shown in FIG. 10. A further advantage of employing press fitted inserts to provide the locating surfaces is that wear can easily be taken up by simply fitting new inserts, also any inaccuracy in the drilling of holes 30 and 31 can be compensated for in the dimensions of the inserts: this means that less precision is required during manufacture of the body of the knee turner bracket.

Figure 11:
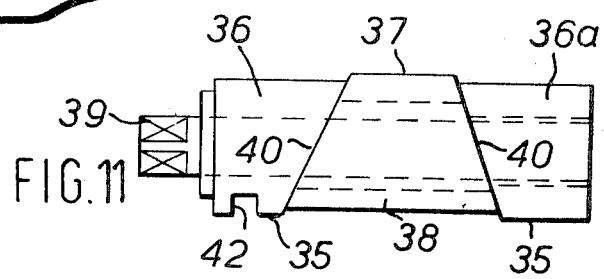
FIG. 11 is a side elevation of a wedge device for incorporation in apertures of the kind shown in FIGS. 9 and 10.

In the apertures shown in FIGS. 9 and 10 a wedge-type clamping device, shown in FIG. 11, is inserted in the remaining recess 30a. The device contacts the curved surface 30 of the recess along edges 35 of outer wedge members 36, 36a and grips the associated tool holder (not shown) on a flat face 37 of central wedge member 38. The clamping is effected by a transverse movement of the central member relative to the outer members. This transverse movement is produced by axially compressing the clamping device by means of a screw 39 which passes slidably through one outer edge member 36 and is threaded into the other outer wedge member 36a and passes through a clearance hole in the central member. Operation of the screw causes members 38 to slide transversely on wedging surfaces 40. The clamping device shown in FIG. 11 is held in the recess 30a by a washer (not shown) held in a recess 41 by a screw (not shown) and entering a groove 42 formed in the outer wedge member 36.

What I claim is:

1. In a machine tool having tool support structure and a spindle axis, the combination comprising a tool carrier arranged to be mounted on said tool support structure, a tool holder arranged to be supported and located by said tool carrier in a predetermined position thereon, said tool holder being arranged to hold a tool in an adjustably preset position relative thereto, said tool carrier being provided with means defining an aperture in which said tool holder is supported and located, the means defining said aperture including two angularly inclined locating surfaces, arranged to extend parallel to the spindle axis of the machine, said tool holder having corresponding seating surfaces for being clamped against said locating surfaces of the tool carrier, and clamping means for releasably holding the tool holder with its seating surfaces in engagement with the respective locating surfaces of the tool carrier, said angularly inclined locating surfaces being positioned at accurately known distances from the machine spindle axis and the tool holder and tool carrier being provided with corresponding engaging abutment surfaces so as to determine the position of the tool holder along an axis parallel to the machine spindle axis in the operative position of the tool carrier, whereby said tool holder and associated tool can be accurately positioned relative to the machine spindle axis using the locating and abutment surfaces as reference data.

2. A tool carrier arranged to be mounted on a machine tool, the carrier having two locating surfaces for engagement with corresponding seating surfaces formed on a tool holder, the locating surfaces being angularly inclined relative to one another and arranged so that in the operative position of the tool carrier the locating surfaces extend parallel to the spindle axis of the machine tool, said locating surfaces being formed in an aperture of the tool carrier, and clamping means being provided on the tool carrier for releasably holding the tool holder with its seating surfaces in engagement with the respective locating surfaces, said clamping means being in the form of a screw-operated wedge device mounted with its screw axis parallel to the axis of the aperture.

3. A machine tool according to claim 1 wherein the clamping means is in the form of a screw mounted in the carrier and arranged to be engageable with the tool holder.

4. A machine tool according to claim 1 wherein the clamping means is in the form of a screw-operated wedge device mounted with its screw axis parallel to the axis of the aperture.

5. A machine tool according to claim 4 wherein the wedge device comprises a pair of axially outer wedge members and a central wedge member between the outer wedge members, the outer wedge members being mounted in a bore extending parallel to the axis of the aperture and opening at one side into the aperture, a screw device being provided to move the outer wedge members towards one another so as to force the central wedge member into the aperture.

6. A machine tool according to claim 1 wherein at least one of the locating surfaces is formed on a part-cylindrical insert pressed into an open sided recess formed in the carrier and positioned so that the portion of the insert bearing the locating surface is exposed in the aperture.

7. A machine tool according to claim 6 wherein two separate part-cylindrical inserts contained in parallel recesses are provided to form the locating surface.

8. A machine tool according to claim 1 wherein said tool carrier consists of a knee turner bracket having a plurality of apertures.

9. A machine tool according to claim 1 wherein the abutment surface on the tool holder is formed on a collar adjustably secured in position on a shank portion of the tool holder.

10. A tool carrier according to claim 2 wherein the wedge device comprises a pair of axially outer wedge members and a central wedge member between the outer wedge members the outer wedge members being mounted in a bore extending parallel to the axis of the aperture and opening at one side into the aperture, a screw device being provided to move the outer wedge members towards one another so as to force the central wedge member into the aperture.

* * * * *